United States Patent
Weaver

(10) Patent No.: US 7,036,313 B1
(45) Date of Patent: May 2, 2006

(54) CO-GENERATION TURBOCHARGED TURBINE SYSTEM

(76) Inventor: Winstead B. Weaver, 8951 Sunland Blvd., Sun Valley, CA (US) 91352

(*) Notice: Subject to any disclaimer, the term of this patent is extended or adjusted under 35 U.S.C. 154(b) by 66 days.

(21) Appl. No.: 10/812,654

(22) Filed: Mar. 31, 2004

(51) Int. Cl.
| | |
|---|---|
| F02B 29/04 | (2006.01) |
| F02B 33/00 | (2006.01) |
| F01K 23/10 | (2006.01) |
| F01B 21/04 | (2006.01) |
| B63H 9/02 | (2006.01) |
| F02C 7/16 | (2006.01) |
| F02C 1/02 | (2006.01) |
| F01N 5/04 | (2006.01) |
| F01D 13/02 | (2006.01) |
| F02B 37/00 | (2006.01) |
| F02B 41/10 | (2006.01) |
| F02G 5/02 | (2006.01) |
| F02C 3/00 | (2006.01) |
| F02C 6/00 | (2006.01) |

(52) U.S. Cl. .............................. 60/599; 60/618; 60/624; 60/716; 60/805; 60/806

(58) Field of Classification Search ................ 60/599, 60/618, 624, 716, 805, 806
See application file for complete search history.

(56) References Cited

U.S. PATENT DOCUMENTS

| 4,578,955 | A | * | 4/1986 | Medina ..................... 60/729 |
| 5,160,080 | A | * | 11/1992 | Hines et al. ................ 60/805 |
| 5,191,767 | A | * | 3/1993 | Kane et al. ................. 60/728 |
| 6,357,218 | B1 | * | 3/2002 | Ranasinghe et al. ......... 60/775 |
| 2005/0072164 | A1 | * | 4/2005 | MacKay ..................... 60/805 |

* cited by examiner

*Primary Examiner*—Sheldon J Richter
(74) *Attorney, Agent, or Firm*—Albert O. Cota

(57) ABSTRACT

A co-generation turbocharged turbine system that utilizes a gas turbine (10) connecting the exhaust to a turbocharger (24) to introduce pressurized air into the inlet of the turbine for improving power and efficiency. A second embodiment places a work load (22) on an extension of the same power shaft (30), thereby connecting both the turbocharger driven rotor and drive rotor together in the form of an extended power shaft (30'). The turbocharger is in fluid communication from the gas turbine exhaust and is connected to the gas turbine air intake from the drive rotor of the turbocharger. A third embodiment consists of the same elements as the second embodiment except the work load (34) is driven by a turbocharger double-extended power shaft (30") which extends from a vapor generating sub-system that has been added to the invention. The vapor generating sub-system consists of a vapor generator (36), a vapor driven turbine (38) and a condenser (40) which utilizes the exhaust from the turbocharger, thus converting it to energy as a form of work using the vapor driven turbine.

10 Claims, 4 Drawing Sheets

CO-GENERATION TURBOCHARGED TURBINE SYSTEM

TECHNICAL FIELD

The present invention relates to systems employing gas turbines in general, and more specifically to a gas turbine driving a turbocharger with exhaust gas supplying compressed air to the inlet of the turbine for facilitating improved efficiency.

BACKGROUND ART

Previously, many types of systems have been used in endeavoring to provide an effective means for improving the efficiency of a gas powered engine.

A search of the prior art did not disclose any patents that possess the novelty of the instant invention, however the following U.S. patents are considered related:

| U.S. Pat. No. | Inventor | Issue Date |
| --- | --- | --- |
| 4,551,971 | Suzuki | Nov. 12, 1985 |
| 4,658,587 | Ecomard | Apr. 21, 1987 |
| 5,105,620 | Matsumura | Apr. 21, 1992 |
| 5,115,641 | Kakuta | May 26, 1992 |
| 5,791,146 | Dungner | Aug. 11, 1998 |
| 6,138,648 | Zentgraf | Oct. 31, 2000 |

Suzuki in U.S. Pat. No. 4,551,971 teaches a boosting device for temporarily increasing the power of a turbo jet engine. The device comprises means for atomizing a mixture of fuel and an aqueous solution of methanol.

U.S. Pat. No. 4,658,587 issued to Ecomard comprises a pressure controller connected to a fluid source through a first calibrated aperture located on a bypass circuit that is parallel with a utilization circuit. The bypass circuit contains a second aperture that closes when pressure in the controller reaches a set value that is lower than the pressure required to actuate a bypass valve.

Matsumura in U.S. Pat. No. 5,105,620 discloses a secondary air supply system for a supercharged engine which includes an electrically controlled valve that controls a diaphragm operated valve. The diaphragm operated valve closes a secondary air supply passage to prevent exhaust gas from entering an intake passage under high load conditions, but opens under a low load condition.

Kakuta in U.S. Pat. No. 5,115,641 teaches a method and apparatus for driving a turbosupercharger in which an exhaust gas turbine is driven by an internal combustion engine. A supercharging turbine is driven by the exhaust gas turbine such that the engine receives a boost in suction pressure on the air intake.

U.S. Pat. No. 5,791,146 issued to Dungner discloses a supercharged turbine with an exhaust gas that flows in series after the turbine of the supercharger and is driven by the exhaust which has passed through the supercharger. The turbine delivers a partial gas flow which is returned to an inlet manifold, with some of the flow tapped to pressurize the compressor stage. The turbine is controlled by a wastegate valve and the partial exhaust gas flow to the compressor is controlled by a separate valve.

Zentgraf in U.S. Pat. No. 6,138,648 discloses an intake device for a supercharged, internal combustion engine. A supercharged air cooler is integrated into an air filter box that cools the supercharger air in the event that it is installed in the rear of a vehicle.

For background purposes and as indicative of the art to which the invention is related reference may be made to the remaining cited patents issued to Satow et al. in U.S. Pat. No. 4,498,429, Ammann et al. in U.S. Pat. No. 4,760,702, Kakuta in U.S. Pat. No. 4,864,825 and Kageyama et al. in U.S. Pat. No. 5,269,266.

DISCLOSURE OF THE INVENTION

The co-generation turbocharged turbine system provides a method for improving the overall efficiency of a basic gas turbine. In its most basic configuration the inventive system consists of:

a) A gas turbine having an air intake and an exhaust outlet, b) A turbocharger having a driven rotor and a drive rotor on a common power shaft, in fluid communication from the gas turbine exhaust outlet to the driven rotor, and in fluid communication to the gas turbine air intake from the drive rotor of the turbocharger for increasing the turbine's power and efficiency, and c) A work load that is connected to the turbocharger common power shaft, thus changing the exhaust force from combustion within the gas turbine into rotary motion on the turbocharger common power shaft to create usable energy.

In the basic system, the workload is driven by the gas turbine itself, as is customary, however a turbocharger is connected to the exhaust of the turbine, which is normally unused energy. The turbocharger provides compressed air into the inlet of the turbine, thereby providing increased power and efficiency as the turbine air compressor is not confronted with prevailing atmospheric pressure as it is already compressed and heated.

The second embodiment of the invention places the workload on an external shaft of the turbocharger, which may alter the driven speed according to the design of the internal rotors. This causes the speed to be more usable compared to the high rotational speeds of the turbine itself, which commonly require some type of gear or speed reducing apparatus.

The third embodiment utilizes a vapor generator, such as a steam generator, which is connected to the exhaust of the turbocharger to further utilize retained heat from the turbine exhaust and to convert this energy into an additional vapor driven turbine that shares the same power shaft as the turbocharger. The work load then receives its rotational torque from both the turbocharger and the vapor driven turbine, again utilizing even more of the energy created by the gas turbine. Additional options to this embodiment include a high temperature electrolyzer that is either in line between the gas turbine and the turbocharger, or after the vapor generator to separate water into hydrogen and oxygen by using the residual heat of the exhaust. The hydrogen may be used to augment the fuel used in the gas turbine.

In view of the above disclosure, the primary object of the invention is to improve the power and efficiency of a basic gas turbine engine by using as much of the residual heat and pressure from the turbine's exhaust as possible, thus converting it into work, which is customarily in the form of electricity.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
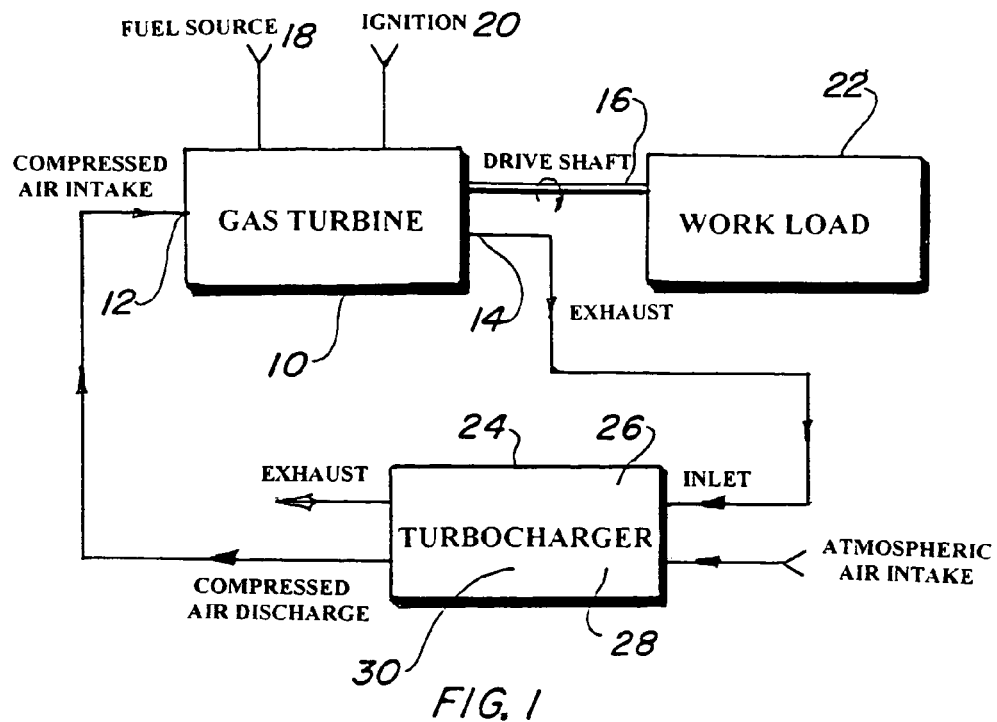
FIG. 1 is a block diagram of a co-generation turbocharged turbine system in a preferred simplified embodiment.

The best mode for carrying out the invention is presented in terms of a preferred, second and third embodiment. The preferred embodiment of the co-generation turbocharged turbine system, as shown in FIG. 1, is comprised of a gas turbine 10 having an air intake 12 and an exhaust outlet 14. The turbine consists of an air compressor, a combustion chamber and at least one turbine wheel mounted on a drive shaft 16, common with the air compressor and combustion chamber. The turbine 10 functions by rotating the turbine wheel by the force of moving fluid created within the combustion chamber.

The turbine 10 requires a fuel source 18 and ignition means 20, which are defined as an electrical power source such as an electrical spark, or an element heated above the combustion point of the fuel 18. The fuel 18 may be any combustible fluid such as oil, diesel, kerosene, natural gas, hydrogen, etc.

In the preferred embodiment, the turbine 10 drives a work load 22 through the drive shaft 16, which may include a speed reducing gearbox, or the like, to obtain usable rotational speed. The work load 22 consists of any type of energy using device that employs rotational torque, with an electrical generator or alternator being the most common.

A turbocharger 24 includes a driven rotor 26 and a drive rotor 28, which are further defined as the driven "air compressor" rotor 26 and the "exhaust" drive rotor 28, with both located on a common power shaft 30. The turbocharger 24 is positioned in fluid communication with the gas turbine exhaust outlet 14 to the driven rotor 26. The turbocharger 24 is also in fluid communication with the gas turbine air intake 12 from the drive rotor 28 of the turbocharger 24. This arrangement increases the turbine's power and efficiency by decreasing the load on the turbine's air compressor, as ambient air from an atmospheric air intake 32 is pressurized by the drive rotor 28 of the turbocharger 24 before the air is introduced into the air intake 12 of the turbine 10.

Figure 2:
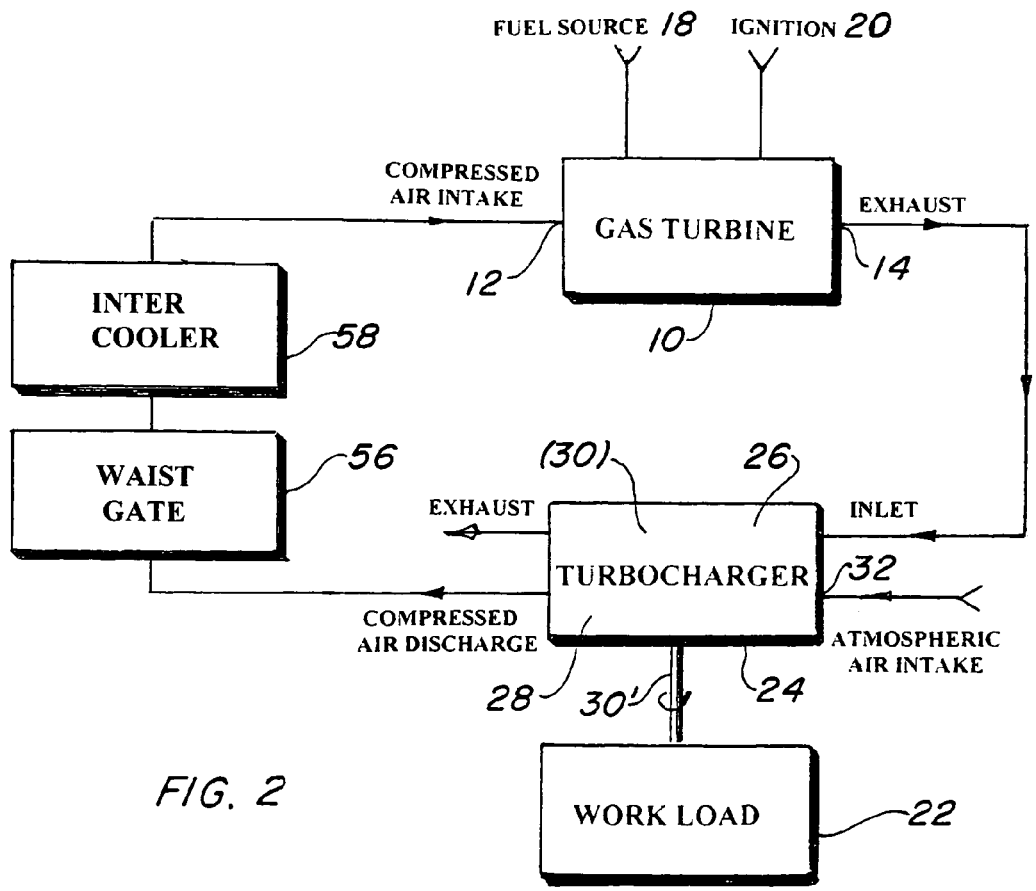
FIG. 2 is a block diagram of the system in a second embodiment of the co-generation turbocharged turbine system having the work load driven by the turbocharger.

The second embodiment, as illustrated in FIG. 2, incorporates all of the same elements as the preferred embodiment except that the work load 22 is driven, not by the drive shaft 16 of the turbine 10, but by an extended power shaft 30' of the turbocharger 24 that replaces or extends the power shaft 30. The work load 34 is therefore connected to the turbocharger extended power shaft 30', which extends external to the turbocharger body, thereby changing the exhaust force from combustion within the gas turbine 10 into rotary motion on the turbocharger extended shaft 30' to create usable energy. The work load 34 in this embodiment is also preferably an electrical energy producing device that is attached to the extended power shaft 30'. The energy producing device may be an electric generator, an alternator or the like, however other types of work may also be accomplished with equal ease. The second embodiment has the advantage of reducing the speed of the extended power shaft 30' by selected configuration of the blades of the driven rotor 26. Further, a waist gate 56 and intercooler 58 are added between the compressed air discharge of the turbocharger 24 and the compressed air intake of the gas turbine 10.

Figure 3:
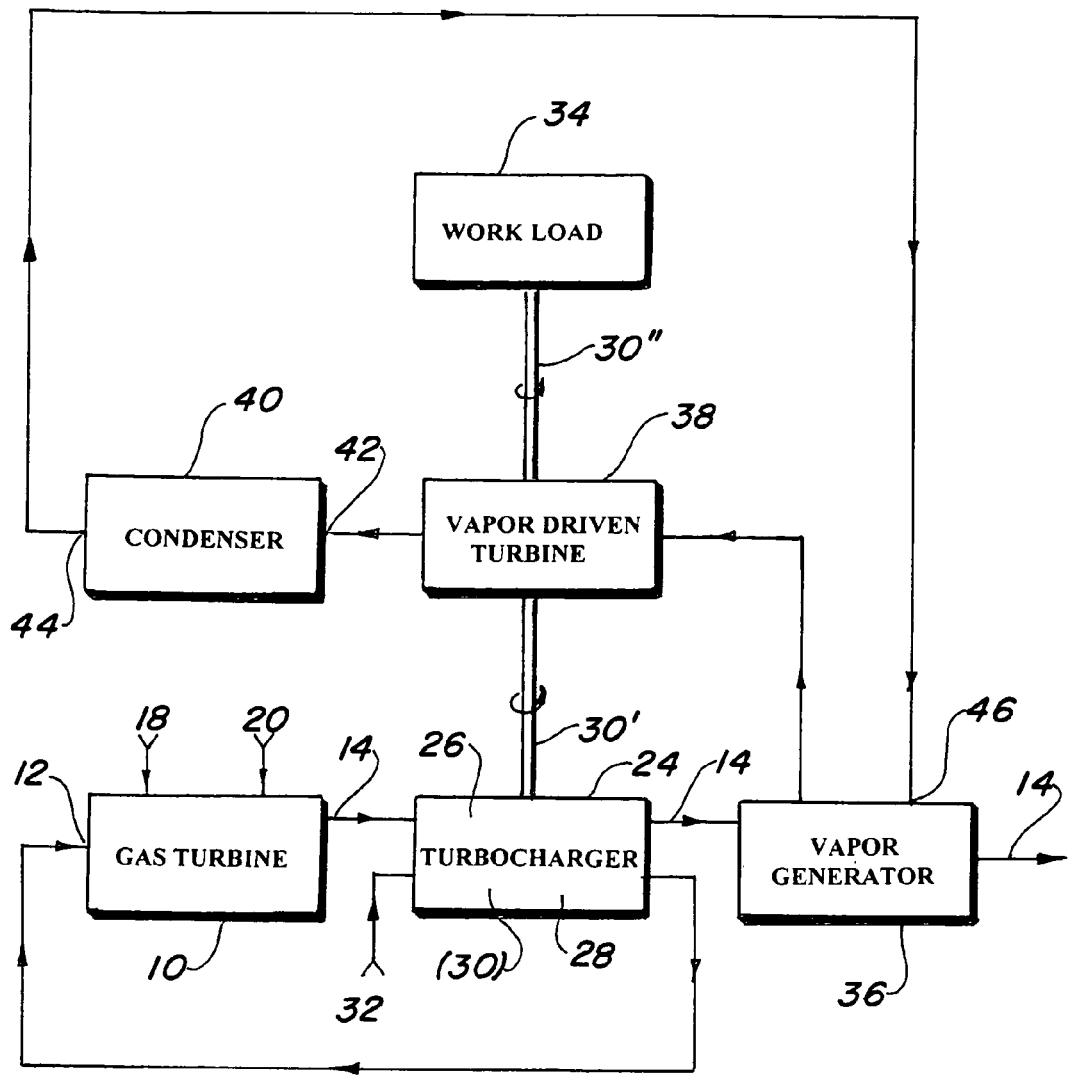
FIG. 3 is a block diagram of the system in a third embodiment of the co-generation turbocharged turbine system having the work load driven by both the turbocharger and the addition of a vapor generator in the system.
Figure 4:
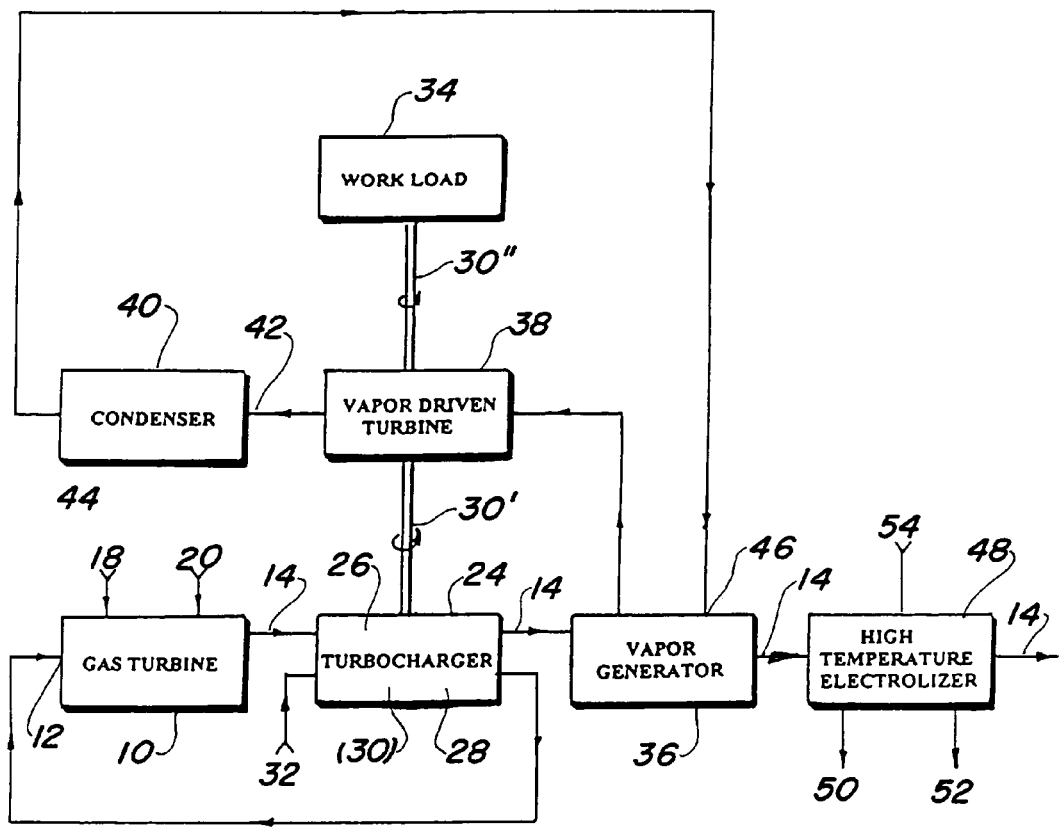
FIG. 4 is a block diagram of the system in a third embodiment of the co-generation turbocharged turbine system with an optional alternate addition of a high-temperature electrolyzer added in the exhaust of the vapor generator.
Figure 5:
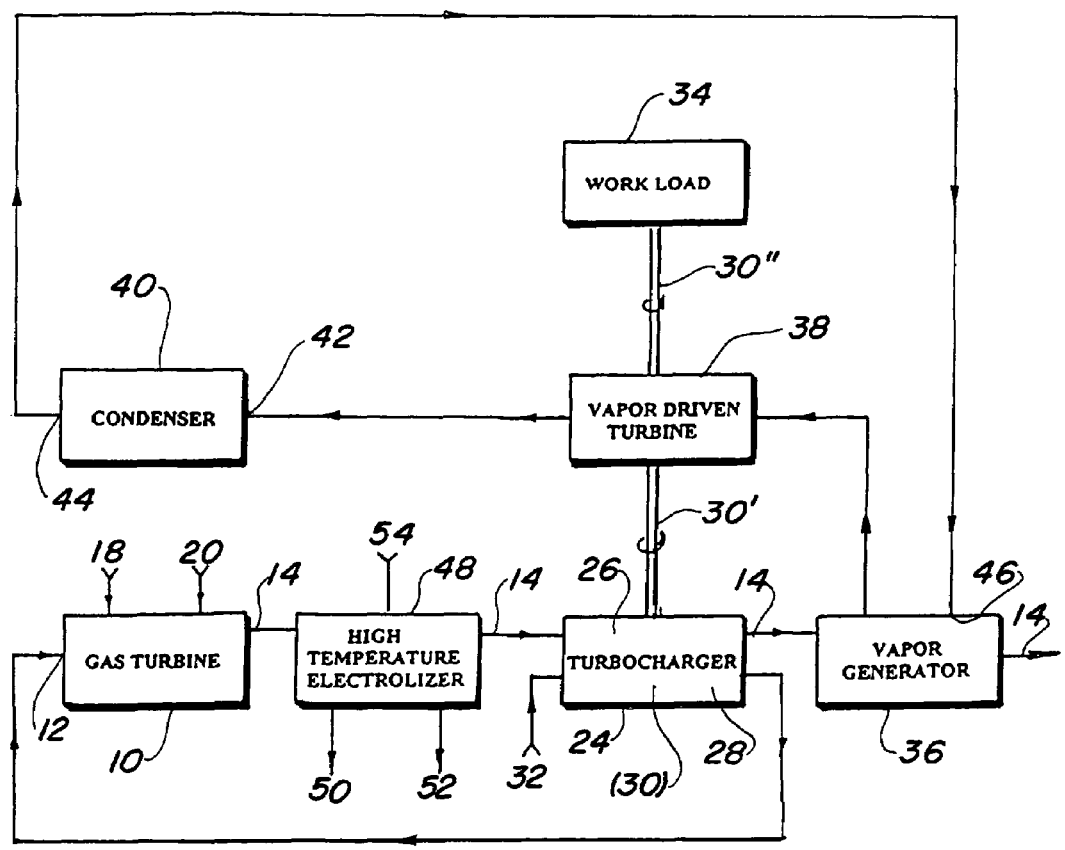
FIG. 5 is a block diagram of the system in the third embodiment of the co-generation turbocharged turbine system with an optional alternate addition of a high-temperature electrolyzer between the gas turbine and the turbocharger.

The third embodiment is depicted in FIGS. 3–5 and again consists of the same elements as the second embodiment except the work load 34 is driven by a turbocharger, double-extended power shaft 30" extending from a vapor generating sub-system that has been added to the invention.

A vapor generator 36 is placed in fluid communication with the turbocharger 24 at its exhaust from the driven rotor 26, which is designed to produce high pressure vapor when a liquid capable vaporizing of is introduced therein. The liquid may be water, ammonia or any other similar substance with similar physical characteristics. In the case of water, steam is produced which is superheated to a high pressure by the exhaust gasses passing through the generator 36.

The superheated vapor then enters a vapor driven turbine 38, which includes its own vapor driven turbine power shaft, which is in turn attached to the turbocharger extended power shaft 30', thus forming the double-extended power shaft 30", as illustrated in the drawings, either by direct connection or by actually lengthening the entire shaft. The addition of this sub-system increases energy to the combined shafts, with the addition of power developed by high pressure, high temperature vapor from the vapor generator 36.

The work load 34 in this embodiment is attached to the vapor driven turbine power shaft through the double-extended power shaft 30", which ultimately employs unused energy from the gas turbine exhaust 14.

A condenser 40 having an inlet 42 and an outlet 44 is also added to this sub-system. The inlet 42 is in communication with the vapor driven turbine 38, and the outlet 44 is in communication with the vapor generator 36. The outlet 44 is used for condensing the vapor utilized in a vapor driven turbine 38 into a liquid and returning the liquid to the vapor generator condensed liquid inlet 46 in a closed loop manner.

In a first optional variation of the third embodiment, a high temperature electrolyzer 48 which is in communication with the exhaust of the vapor generator 36 is added to the system. The functional utility of this additional element is to separate hydrogen 50 and oxygen 52 from water 54, thereby utilizing the remaining heat in the system ultimately supplied by the gas turbine 10. This option is illustrated in FIG. 4.

A second optional variation, shown schematically in FIG. 5, utilizes the same high temperature electrolyzer 48 except it is disposed between the exhaust outlet of the gas turbine 10 and the inlet of the turbocharger 24. The electrolyzer 48 is also used to separate hydrogen 50 and oxygen 52 from water 54 in the same manner as above. In either case the temperature of the exhaust gas from the turbine 10, which is normally approximately 1,300 to 1,450 degrees Fahrenheit (704 to 788 degrees Celsius), is sufficient to achieve this basic element separation from water, even when other devices are in the system, as hydrogen may be released at approximately 1,000 degrees Fahrenheit (538 degrees Celsius). It may be seen that the hydrogen gas may also be used as fuel for the gas turbine 10, or as an additive to the normal fuel utilized.

It may be visualized that the system disclosed for invention employs the use of exhaust gases from the gas turbine 10 to create work, whereas the exhaust gases normally represent a waste of power.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A co-generation turbocharged turbine system comprising:
   a) a gas turbine having an air intake and an exhaust outlet,
   b) a turbocharger having a driven rotor and a drive rotor on a common power shaft, in fluid communication from said gas turbine exhaust outlet to the driven rotor, and in fluid communication to said gas turbine air intake from the drive rotor of the turbocharger for increasing the turbine's power and efficiency,
   c) a work load connected to said turbocharger common power shaft changing the exhaust force from combustion within the gas turbine into rotary motion on the turbocharger common power shaft to create usable energy, and
   d) a waist gate and intercooler disposed between the turbocharger and the gas turbine air intake.

2. The co-generation turbocharged turbine system as recited in claim 1 wherein said turbocharger further comprises an external power shaft that is integral with said common shaft.

3. The co-generation turbocharged turbine system as recited in claim 2 wherein said work load is an electrical energy producing device that is attached to said external power shaft.

4. The co-generation turbocharged turbine system as recited in claim 3 wherein said electrical energy producing device is selected from the group consisting of an electric generator or an alternator.

5. The co-generation turbocharged turbine system as recited in claim 2 further comprising a vapor generator which is in fluid communication with said turbocharger exhaust and that produces high-pressure vapor when a liquid capable vaporizing is introduced therein.

6. The co-generation turbocharged turbine system as recited in claim 5 further comprising a vapor driven turbine having a vapor driven turbine power shaft attached to the turbocharger power shaft, which increases energy to the combined shafts with the addition of power developed by high pressure vapor from the vapor generator.

7. The co-generation turbocharged turbine system as recited in claim 6 wherein further comprising a work load attached to said vapor driven turbine power shaft which ultimately employs unused energy from the gas turbine exhaust.

8. The co-generation turbocharged turbine system as recited in claim 7 further comprising a condenser having an inlet and an outlet, with the inlet in communication with the vapor driven turbine and the outlet in communication with the vapor generator for condensing the vapor utilized in the vapor driven turbine into a liquid returning the liquid to the vapor generator condensed liquid inlet in a closed loop manner.

9. The co-generation turbocharged turbine system as recited in claim 8 further comprising a high-temperature electrolyzer in communication with said vapor generator exhaust for separating hydrogen and oxygen from water by utilizing heat that is ultimately supplied by the gas turbine.

10. A co-generation turbocharged turbine system comprising:
    a) a gas turbine having an air intake and an exhaust outlet,
    b) a turbocharger having a driven rotor and a drive rotor on a common power shaft, in fluid communication from said gas turbine exhaust outlet to the driven rotor and in fluid communication to said gas turbine air intake form the drive rotor of the turbocharger for increasing the turbine's power and efficiency,
    c) a work load connected to said turbocharger common power shaft changing the exhaust force from combustion within the gas turbine into rotary motion on the turbocharger common power shaft to create usable energy, and
    d) a high-temperature electrolyzer disposed in said exhaust outlet of said gas turbine and said turbocharger driven rotor for separating hydrogen and oxygen from water utilizing heat that is ultimately supplied by the gas turbine.

* * * * *